United States Patent [19]
Sanderford, Jr. et al.

[11] Patent Number: 4,799,062
[45] Date of Patent: Jan. 17, 1989

[54] RADIO POSITION DETERMINATION METHOD AND APPARATUS

[75] Inventors: H. Britton Sanderford, Jr.; Robert E. Rouquette, both of New Orleans; James D. Arthur, Metairie, all of La.

[73] Assignee: Axonn Corporation, New Orleans, La.

[21] Appl. No.: 42,838

[22] Filed: Apr. 27, 1987

[51] Int. Cl.⁴ ............................................. G01S 03/02
[52] U.S. Cl. .................................. 342/450; 342/453; 342/457
[58] Field of Search ................. 342/450, 453, 457, 357

[56] References Cited

U.S. PATENT DOCUMENTS 2,972,742  2/1961  Ross .
3,206,751  9/1965  Knight .
3,303,501  2/1967  Mahoney .
3,680,121  7/1972  Anderson et al. .
3,715,758  2/1973  Sender .
3,803,610  4/1974  Hastings et al. .
3,848,254  11/1974 Drebinger et al. .
3,886,553  5/1975  Bates .
3,886,554  5/1975  Braun et al. .
3,986,119  10/1976 Hemmer, Jr. et al. .
3,997,902  12/1976 Nard .
4,002,983  1/1977  Kavalir .
4,083,003  4/1978  Haemmig .
4,104,635  8/1978  Broduer .
4,117,404  9/1978  Marshall .
4,150,380  4/1979  Broduer .
4,161,730  7/1979  Anderson .
4,191,985  3/1980  Phillips, Jr. .
4,215,345  7/1980  MacDoran .
4,217,588  8/1980  Freeny, Jr. .
4,224,596  9/1980  Knickel .
4,302,759  11/1981 Mori et al. .
4,359,733  11/1982 O'Neill ............................. 342/357
4,368,470  1/1983  Mori et al. .
4,494,119  1/1985  Wimbush .
4,656,476  4/1987  Tavtigian .
4,701,760  10/1987 Raoux .

FOREIGN PATENT DOCUMENTS 1543910  4/1979  United Kingdom .
2094089  9/1982  United Kingdom .

OTHER PUBLICATIONS

Motor Vehicle Antihijack System, Proceedings of the First International Electric Crime Countermeasures Conference, Jul. 18–20, 1973, at Edinburgh, Scotland.
Carnahan Conference on Crime Measures, May 7–9, 1975 at Lexington, Ky.

Primary Examiner—Theodore M. Blum
Assistant Examiner—Mark Hellner
Attorney, Agent, or Firm—David B. Newman, Jr.

[57] ABSTRACT

A method and apparatus for radio position determination is provided including an unknown position transmitter for transmitting a radio wave having compensation for multipath, a plurality of base repeaters having a synchronized pulse for time reference, for receiving the radio wave emitted by the unknown position transmitter and for determining the relative times-of-arrival of the radio wave with respect to the synchronized pulse, and a central monitoring station coupled to the base repeaters for computing from the locations of the base repeaters and from the measured times-of-arrival, a coarse-position fix of the unknown-position transmitter. The system may include a mobile reference transceiver located within the coarse-position fix, for transmitting a reference signal, wherein the central monitoring station generates a differential position from the reference signal and the radio wave for guiding the mobile reference transceiver to the unknown position transmitter.

22 Claims, 3 Drawing Sheets

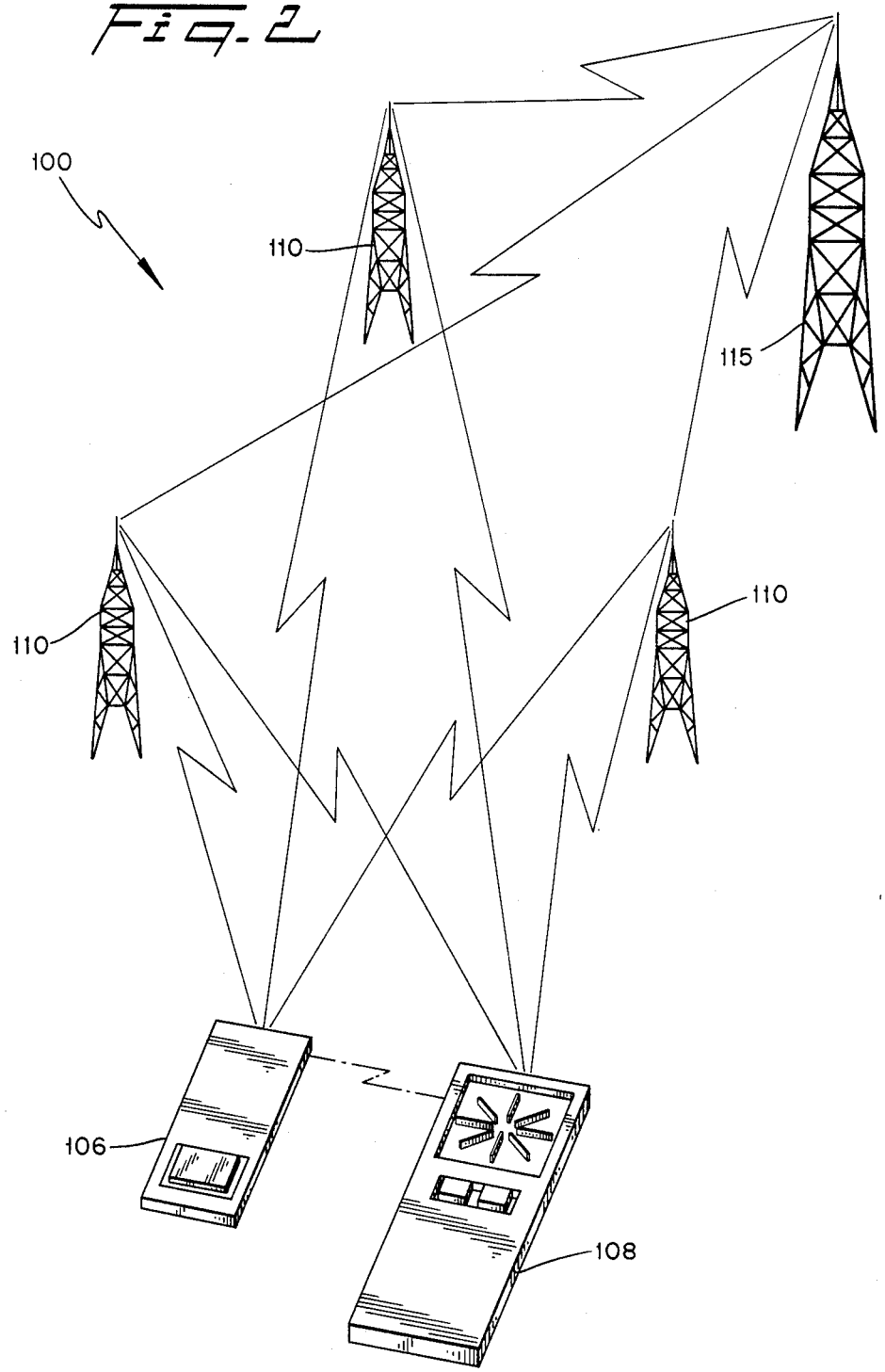

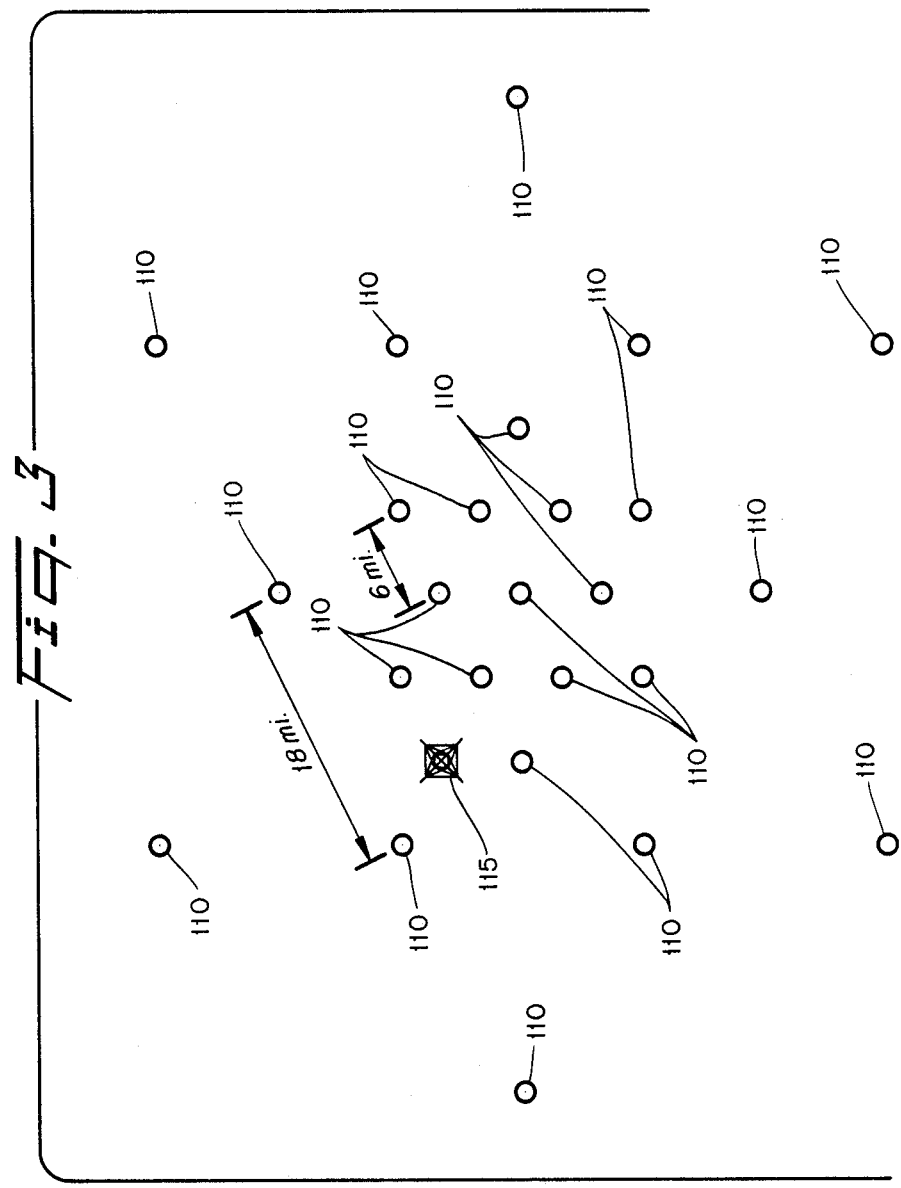

RADIO POSITION DETERMINATION METHOD AND APPARATUS

BACKGROUND OF THE INVENTION

This invention relates to radio position determination of an unknown position transmitter using a known-reference transceiver and a plurality of repeaters located at known geographic locations in a geographic area. The repeaters are coupled to a central monitoring station which transmits a master grid synchronization pulse for time reference.

DESCRIPTION OF THE PRIOR ART

A variety of radio position determination methods and systems have been proposed for detecting and locating vehicles, and optimized for specific applications, particularly aircraft and ships at sea. Each of these systems uses one or more specific radio characteristics including frequency, amplitude, phase, frequency shift and phase shift/time-of-flight. These characteristics have practical limitations which must be overcome to make any system viable. An air-traffic control, ground-to-air system imposes limitations which are considerably different from a long range nautical navigation system for locating ships at sea. Although many radio positioning systems are available it is highly unlikely that any two particular systems could be interchanged between specific applications without noticeable degradation in performance.

An illustrative example of a prior art system, U.S. Pat. No. 3,886,553 to Bates, discloses a method and system for measuring the geographical position of radio transmitters. The system includes widely spaced trilateration receiver stations, positioned to cover a preselected area and to receive transmitted signals. The relative time-of-arrival of each individual signal pulse received at the receiver stations is transmitted to a central processing unit. Generally, this patent relates to locating targets in large geographical space.

U.S. Pat. No. 4,215,345 to MacDoran discloses a system for determining the position of a vehicle or other target that emits radio waves, which uses the difference in time-of-arrival of signals received from the vehicle at spaced ground stations. A network of four ground stations detects the radio emissions, and by means of cross-correlation derives the relative signal delay at the ground stations from which the vehicle position is determined. By positioning one of the four ground stations at an elevation significantly different above the plane of the other three stations, a three dimensional fix on the vehicle is possible.

FIG. 1 shows the overall arrangement of one prior art position location system, which can locate a target 10 which emits radio waves. The system includes a central processing station 12, and a plurality of automated receiving stations 14. Radio frequency signals are received by broad beamed antennas at the stations 12, 14, that are connected through microwave links to the central processing station 12. The central processing station calculates the position of the target 10 based upon the time-of-arrival differences of the same radio signals received at the plurality of stations 12, 14. In the prior art, these differences in time-of-arrival define a hyperbolic surface of revolution on which the target is located. The actual position of a target can be determined by detecting the emitted signal at three independent pairs of location to define three hyperbolas of revolution, and by calculating the intersection of three hyperbolas of revolution.

Problems with using prior art systems in an urban environment include multipath which may lead to incorrectly locating an unknown position transmitter.

Generally, the prior art teaches position location for navigation equipment of vehicles and airplanes in large geographical areas. The prior art which typically does not encounter a multipath environment for radio wave propagation does not teach position locations for determining the location of unknown position transmitters in an urban environment having multipath propagation due to buildings. More particularly, the prior art does not each how to locate an unknown position transmitter within a very close proximity in an urban area so that a emergency team can quickly and rapidly be dispatched and find the unknown position transmitter.

Also, there is no teaching in the prior art of using overlapping tiers of position determination concepts to overcome in the effects of multipath in an urban environment. Instead, the prior art teaches methods and apparatus for determining the positional locations in large geographical areas or for direction finding the position of a transmitter.

OBJECTS AND SUMMARY OF THE INVENTION

An object of the present invention is to provide a method and apparatus of radio position determination for locating an unknown position transmitter.

Another object of the present invention is to provide a radio-based determination method and system that is suitable for personal life safety applications.

A further object of the present invention is to provide an inexpensive pocket portable, radio position transmitter with a unique identification code coupled to a 24 hour central dispatch/data station.

An additional object of the present invention is to provide a method and apparatus for locating an unknown position transmitter that is highly accurate.

A further object of the present invention is to provide a method and apparatus for locating an unknown position transmitter in an urban environment which overcomes the effects of multipath and other propagation problems due to tall buildings in the urban environment.

According to the present invention, as embodied and broadly described herein, a method of radio position determination of an unknown position transmitter using a mobile-reference transceiver and a plurality of base repeaters located at known geographic locations in a geographic area, coupled to a central monitoring station, which transmits a master grid synchronization pulse for time reference, is provided comprising the steps of retransmitting the master grid synchronization pulse by the base repeaters as a slave grid synchronization pulse, and emitting within the geographical area a radio wave by the unknown position transmitter. The radio wave has compensation for multipath, which may include spread spectrum modulation techniques. At least three base repeaters receive the radio wave emitted by the unknown position transmitter, and measure relative times-of-arrival of the radio wave with respect to the master grid synchronization pulse based on a phase measurement of a dual tone burst transmitted by the unknown position transmitter, to derive relative ranging times and therefore ranges from the base repeaters to the unknown position transmitter. The steps further include computing a coarse-position fix of the unknown-position transmitter from the locations of the base repeaters and the ranges. A search team with a mobile reference transceiver is dispatched to the coarse-position fix to locate the unknown position transmitter. The reference transceiver transmits a reference signal having compensation for multipath, which may include spread spectrum modulation techniques. The base repeaters receive the reference signal and the central monitoring station computes a difference between the reference signal and the radio wave, to derive a differential position vector (magnitude and direction) from the unknown position transmitter to the mobile reference transceiver. The differential position vector between the mobile reference transceiver and the unknown position transmitter is calculated by the central monitoring station, and the search team with the mobile reference transceiver is guided to the unknown position transmitter using the differential position vector calculated between the mobile reference transceiver and the unknown position transmitter.

The method can further include the steps of having the mobile reference transceiver emit a polling message, and having the unknown position transmitter in response to receiving the polling message, emit a reply message. Accordingly, a local-time-of-flight independently is computed from the polling message and the reply message and therefore the local range from the mobile reference transceiver to the unknown position transmitter is determined. Further, the steps can further include having the unknown position transmitter emit an audible sound for assisting the search team in locating the unknown position transmitter.

The present invention alternatively includes a radio position determination apparatus comprising an unknown position transmitter, a plurality of base repeaters which transmit a slave grid synchronization pulse for time reference, a central monitoring station coupled to the plurality of base repeaters, and a mobile reference transceiver. The unknown position transmitter transmits a radio wave having compensation for multipath. The central monitoring station transmits a master grid synchronization pulse and the plurality of base repeaters retransmit the master grid synchronization pulse as a slave grid synchronization pulse. At least three base repeaters receive transmissions from the unknown position transmitter and determine times-of-arrival of the received radio waves with respect to the time reference derived from the master grid synchronization pulse's modulations. The central monitoring station, which is coupled to the base repeaters, determines a coarse-position fix of the unknown-position transmitter using the relative times-of-arrival of the radio wave received at the plurality of base repeaters. A search team with a mobile reference transceiver is dispatched to the coarse-position fix. The mobile reference transceiver transmits a reference signal having compensation for multipath. The compensation for multipath may include, but is not limited to, spread spectrum modulation techniques. The central monitoring station computes a difference between the received reference signal and the radio wave. The central monitoring station determines the differential position vector between the mobile reference transceiver and the unknown position transmitter from the computed difference, and guides the search team with the mobile reference transceiver to the unknown position transmitter.

The radio position determination system can further include having the mobile reference transceiver emit a polling message, and having the unknown position transmitter, in response to receiving the polling message, emit a reply message. The mobile reference transceiver, in response to receiving the reply message, independently determines a local-time-of-flight from the mobile reference transceiver to the unknown position transmitter and therefore the local range from the mobile reference transceiver to the unknown position transmitter, for assisting in locating the unknown position transmitter.

Additional objects and advantages of the invention will be set forth in part in the description which follows, and in part will be obvious from the description or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 2 shows a radio position determination system according to the present invention; and FIG. 3 shows an antenna site array covering a geographical area according to the present invention.

DETAILED DESCRIPTION OF THE PREFERRED EMBODIMENTS

Figure 1:
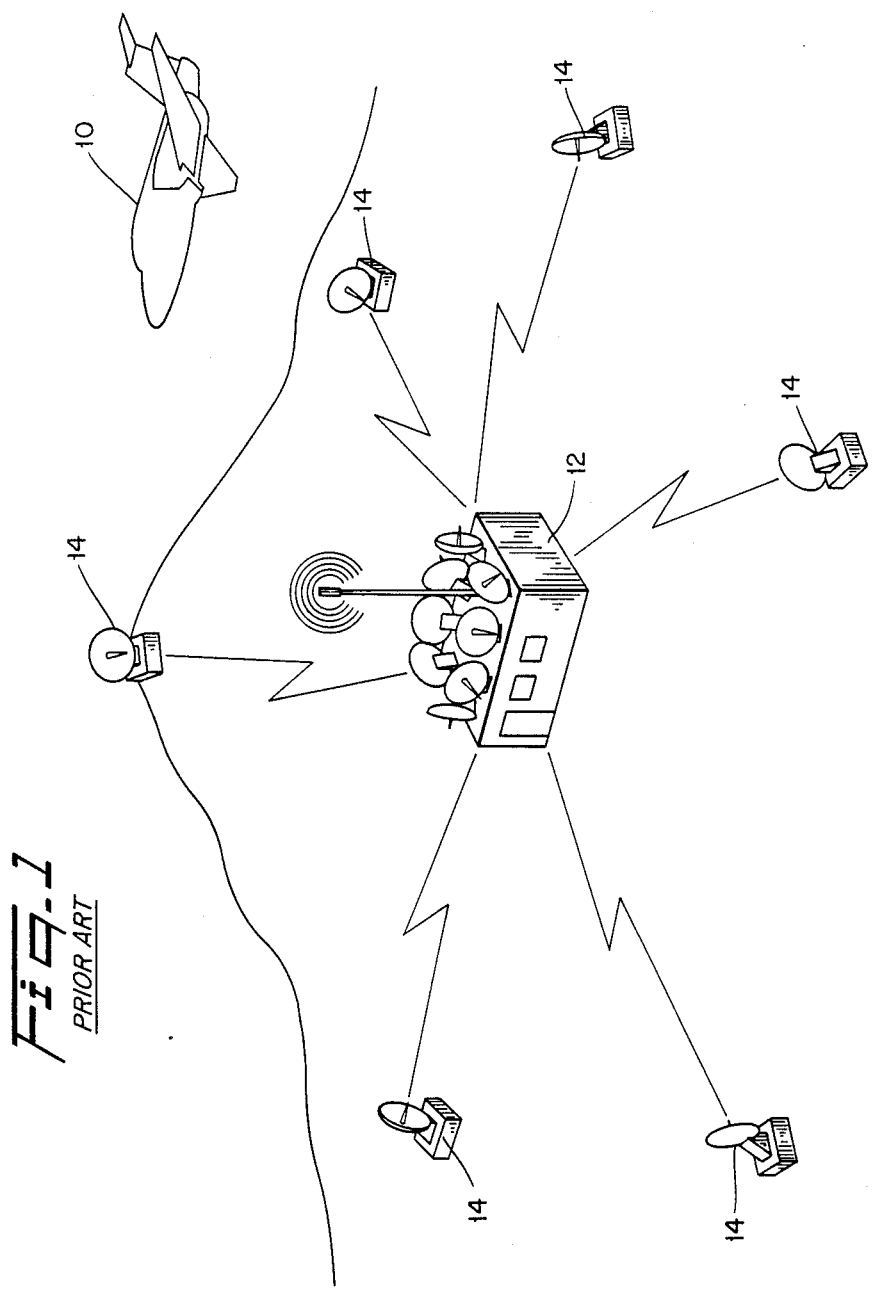
FIG. 1 shows a conceptual schematic diagram of a group of stations for detecting the location of an aircraft.

Reference will now be made to the present embodiments of the invention, examples of which are illustrated in the accompanying drawings.

Referring to FIG. 2, a preferred embodiment of a radio position determination system 100 is shown comprising an unknown position transmitter 106, mobile reference transceiver 108, a plurality of base repeaters 110 and central monitoring station 115 The central monitoring station 115 transmits a master grid synchronization pulse for time reference. The plurality of base repeaters 110 retransmit the master grid synchronization pulse as a slave grid synchronization pulse for time reference in response to receiving the master grid synchronization pulse from the central monitoring station 115. Thus, the central monitoring station 115 originates the master grid synchronization pulse which is rebroadcasted by base repeaters 110 for synchronizing the entire system. The plurality of base repeaters 110 receive radio waves transmitted from the unknown position transmitter 106 and determine relative times-of-arrival of the received transmissions with respect to the master grid synchronization pulse. A central monitoring station 115 is coupled to the plurality of base repeaters 110. The coupling may be via microwave link, telephone lines, or any other communications link. The central monitoring station 115 determines a coarse-position fix of the unknown position transmitter 106 using the relative times-of-arrival of the radio waves received at the plurality of base repeaters 110. The plurality of base repeaters 110 are at known geographic locations in a geographic area.

FIG. 3 shows an antenna site array of the base repeaters 110 and a location of a central monitoring station 115. In a preferred embodiment, the closest spacing of antennas for base repeaters 110 for an urban environment is six miles in a downtown area. As the distance from downtown increases, the range per watt of the transmitted power increases. Accordingly, the staggering of the base repeaters 110 increases separating distance to a maximum of eighteen miles in the outlying skirts of an area. This is roughly shown in FIG. 3.

The base repeaters 110 operate independently and need only connect to primary power. In a preferred embodiment, the base repeaters 110 require a minimum antenna high of 100 feet in suburban areas and 200 feet in urban areas. The operating frequencies make it possible to use a split-off from many existing antennas including popular communication repeaters, pagers, and cellular radio phone receivers.

The base repeaters 110 transmit the slave grid synchronization pulse. The slave grid synchronization pulse is used by the unknown position transmitter 106 and mobile reference transceiver 108 for synchronizing with the system protocol cycle (slot timing), for acquiring system hop timing, and as a frequency reference for subsequent transmissions. The received carrier frequency from the slave grid synchronization pulse is measured and mimicked by the unknown position transmitter 106 and the mobile reference transceiver 108 to within 0.1 ppm. This is desired for the reduced bandwidth extended range modes.

The times-of-arrival are calculated as the phase difference between the master grid synchronization pulse modulation which would be in a preferred embodiment repeated at one second intervals, and the transmission from the unknown position transmitter 106. In a preferred embodiment, the actual time-of-arrival of the master grid synchronization pulse is not measured, but instead the phase of the master grid synchronization pulse modulation is determined. Similarly, when mobile transmissions from either an unknown position transmitter or mobile reference transceiver are received at the base repeaters 110, the base repeaters 110 compute the phase difference between the modulations on the transmissions from the unknown position transmitter or mobile reference transceiver, and the previously measured phase of the modulation of the master grid synchronization pulse from the central monitoring station 115. The resulting difference in phase, expressed in seconds, provides the propagation time differences that each base repeater 110 relays to the central monitoring station 115.

The central monitoring station 115 uses the geographic locations of the base repeaters 110 and the relative times-of-arrival of the received radio waves with respect to the master grid synchronization pulse, to calculate ranging times and therefore ranges from the base repeaters 110 to the unknown position transmitter 106. Accordingly, the central monitoring station 115 computes a coarse-position fix of the unknown position transmitter 106 from the geographic locations of the base repeaters 110 and ranges. This coarse-position fix can be computed from the locations of the base repeaters 110 and hyperbolic lines of position for the unknown position transmitter 106 based on the ranges. Techniques for performing these calculations are well known in the art.

Each time difference can be used to swing a hyperbolic arc about associated pairs of base repeaters 110. These arcs are called lines of position. Three base repeater readings can yield two arcs that intersect at two points. The intersections converge to one point as additional time differences are used from additional base repeaters 110. In an urban environment, it is unlikely that all if any of these lines of position will converge to a single point. Thus, the central monitoring station 115 includes software for performing a least squares algorithm to fit and plot the lines to a single point. The remaining distance between the lines of position measured and the actual position represents the error in the system. Most of this error is due to multipath effects in the time-of-flight of the radio wave transmitted from the unknown position transmitter 106.

The antenna site array showing the base repeaters 110 across the geographical area, as shown in FIG. 3, is designed to effectively receive a distress signal from a minimum of six base repeaters 110. Since only four base repeaters 110 are required to yield a three dimensional location fix, two or more lines of position can be removed. The choice of removal is based on error distance from a position fix. This adds redundancy to the system as well as removal of the signals most likely effected by multipath propagation.

In a preferred embodiment, the calculated accuracy of the coarse-position fix is 400 feet RMS in the city and 100 feet RMS in the suburbs. Preliminary time-of-flight field tests using cesium atomic clocks as known references, 100 MHz carrier frequency and envelope shaped pulse modulation indicate ±50 feet outdoor accuracy in a suburban area (measuring resolution limit of field system) and ±300 feet RMS, outdoor accuracy in an urban area. This field tested system had no provisions for multipath rejection so the specified ultimate system accuracy should be conservative. Computer simulation indicates that typical altitude (z axis) determination can only be calculated to 30 feet RMS with proper positioning of base repeaters 110 in urban areas. This accuracy is not adequate for floor determination in buildings.

A mobile reference transceiver 108 can be used by any type of search team employing the system. The search team will be attempting to determine the location of the unknown position transmitter 106. The mobile reference transceiver 108 transmits a reference signal having compensation for multipath. The reference signal is received by the base repeaters 110 and relayed to the central monitoring station 115. The central monitoring station 115 computes a difference between the reference signal and the radio wave and derives a differential ranging time and therefore a differential position vector (magnitude and direction) from the unknown position transmitter 106 to the mobile reference transceiver 108. The central monitoring station 115 uses the differential position vector between the mobile reference transceiver 108 and the unknown position transmitter 106, to guide the mobile reference transmitter 108 to the unknown position transmitter 106.

In general, when two transmitters are very close together, the multipath effects on signals emitted from both of the transmitters is nearly identical. Accordingly, in the present invention, when the mobile reference transceiver 108 is near the unknown position transceiver 106, the central monitoring station 115 can calculate the differential position between the two very accurately since the common multipath errors are subtracted. The differential position is determined by comparing the reference signal transmitted by the mobile reference transceiver 108, and the radio wave transmitted by the unknown position transmitter 106. The central computer operator at the central monitoring station 115 can therefore guide via voice radio the search team to an unknown position transmitter 106 by watching the effects on the differential position caused by multipath reduced. The closer the mobile reference transceiver 108 is to the unknown position transceiver 106, the more identical are the common multipaths and the more accurate the difference measurement, and the less is the differential position.

Differential techniques typically yield performance improvements of 10 to 1. In rough field tests of the present invention the improvements equalled the resolution in the system. The projected final system accuracy is 50 feet RMS, 10 feet RMS outdoors. Differential operation however, is of little help in improving altitude (z axis) performance.

All of the position locations calculated above are performed at the central monitoring station 115, and are based on radio waves transmitted and emitted and received through the base repeaters 110.

As a further guide in determining the location of the unknown position transmitter 106, the mobile reference transceiver 108 has the capability to communicate directly with the unknown position transmitter and obtain a local-time-of-flight distance measurement. This local-time-of-flight measurement is used to determine and refine the location of the unknown position transmitter 106 during search operations. In this mode, the mobile reference transceiver 108 emits a polling message and in response to receiving the polling message, the unknown position transmitter 108 emits a reply message. Accordingly, a local-time-of-flight and therefore the local range from the mobile reference transceiver 108 to the unknown position transmitter 106 can be independently computed from the information derived from the polling message and the reply message.

The unknown position transmitter 106 may be anywhere in a large office building including any floor. Since floor layout and materials are uncontrolled, many radio wave exit geometries are possible. Some of these geometries will poorly converge to a single point fix. Differential mode operation is also prone to large direction shifts due to indoor radio wave path geometries. The local time-of-flight acts like an electronic ruler to guide the search team to near indoor proximity of the unknown position transmitter 106.

The local time-of-flight measurement provides a radius to the central monitoring computer. This radius has a known elevation, since the search starts at ground level. Not only does this additional data improve accuracy, because of very high near proximity signal to noise ratios, but provides a reference for altitude (z axis) measurement as well. If it does not, a trip up the closest elevator while monitoring the mobile reference transceiver will indicate the correct floor by displaying the minimum path length.

The accuracy is limited by the number of paths the radio wave must take as well as the phase measurement accuracy and drift during retransmission.

There are both long and short term fades caused by the multipath environment. Long term fading refers to the loss of signal over large areas. Short term fading is the loss of signal observed when moving over distances of one wavelength. Several forms of diversity can be used to overcome these fades:

Spatial diversity separates two antennas by many wavelengths and corresponding radio receivers sum the demodulated signals. Since two radio waves range from constructive to destructive interference in one half wavelength, the combined RMS output of the two antennas is consistent.

Polarization diversity rotates one antenna 90 degrees relative to the other antenna, and the signals are likewise combined as with spatial diversity.

Frequency diversity also can be used. When the bandwidth of the signal is very large, the different frequencies contained within the bandwidth fade at different locations since their wave lengths differ.

The present invention uses frequency hopping to overcome multipath effects. In a preferred embodiment this includes hopping on four 30 KHZ frequency modulated channels, spaced 2 MHz apart, thus requiring a total bandwidth of 120 KHz distributed over a 6 MHz band. The hop is 400 hops per second, which also serves as coarse ranging modulation.

For spread spectrum systems the processing gain or improvement is related to the amount of bandwidth spreading. In the present invention, four fold improvement against noise is provided.

Moreover, the resistance to fading is improved much more than four times: the probability of four simultaneously fading channels at four different frequencies is the fourth power of the probability of fading of a single channel, provided that the channels are spaced widely enough to have independent fading characteristics. In the preferred embodiment of the present invention, the probability of one channel fading is estimated to be 0.05.

The unknown position transmitter 106 and mobile reference transceiver 108 can include means for compensating for multipath. This compensation may include spread spectrum. A spread spectrum system is characterized by having a radio frequency bandwidth significantly greater than the required information bandwidth. Spread spectrum techniques can be used to minimize misleading signal fades that can cause abrupt position fix changes. The spread spectrum technique also averages the received energy over the available bandwidth and improves data communication characteristics as well. Swept frequency and wide deviation FM techniques are not preferred in the present invention due to the strong signal capture effect that can cause abrupt jumps in position fixes due to the capturing of multipath signals. More simple spread spectrum modulation techniques that use the average energy in the band are preferred. The wide bandwidth in spread spectrum has one further advantage due to radio wave diffraction. The diffraction angle of a radio wave is related to frequency, and therefore the diverse frequencies in spread spectrum yield a diversity of diffraction angles. The wider band of diffracted angles helps to make transitions from one multipath to the next more gradual, augmenting smoothing and differential operation.

The unknown position transmitter 106 is required to be synchronized with the central monitoring station 115 to increase system throughput. The master grid synchronization pulse, which originates at the central monitoring station 115, is rebroadcasted by the base repeaters 110 as a slave grid synchronization pulse. This is accomplished by an on-board spread spectrum receiver that occupies the same frequency and bandwidth of the unknown position transmitter 106. When a polling message is generated by a mobile reference transceiver 108, the unknown position transmitter 106 returns the poll as a reply message transmitted in the same phase as the poll message it received. The mobile reference transmitter 108 can now calculate the round trip response time and therefore time-of-flight independent of the coarse fix.

The radio position determination system can further include having the unknown position transmitter 106 emit an audible sound, for assisting the users of the mobile reference transmitter 108 in locating the unknown position transmitter 06. The audible sound might be a loud warble sound, which would be optimized for human depth perception, to speed the search team in locating the unknown position transmitter 106.

In systems optimized for medical emergencies the unknown position transmitter can drive a piezoelectric sonic transducer. The transducer is modulated with a varying frequency optimized both for building structure penetration and for human auditory depth perception cues. Human auditory position sensing has been optimized through thousands of years of evolution, and provides the quickest operator interface for fine positioning.

In operation, the present invention may include an unknown position transmitter 106 with a distress button. A person, for example, in need of emergency help would press the distress button causing the unknown position transmitter 106 to emit a radio wave indicating the need of an emergency or a help condition. The base repeaters 110 would receive the transmissions from the unknown position transmitter 106 and determine the first set of times-of-arrival of the received radio wave. Typically, six base repeaters 110 would receive the transmissions from the unknown position transmitter 106 and measure the relative times-of-arrival with respect to the master grid synchronization pulse. The base repeaters 110 accordingly would relay or transmit the measured relative times-of-arrival to the central monitoring station 115. The central monitoring station 115, with reference to the locations of the base repeaters 110 covering a geographic area, would compute a coarse-position fix, which is in essence a rough grid fix, of the location of the unknown position transmitter 106. A search team would then be dispatched with a mobile reference transceiver 108 in search of the unknown position transmitter 106. The search team would have the capability to have the mobile reference transceiver 108 transmit a reference signal having compensation for multipath. Additionally, the reference signal helps to remove multipath errors from the location of the coarse position fix of the unknown position transmitter 106. Multipath errors might typically occur because the operating frequency desired for a preferred embodiment of the present invention might lie in the UHF radio band. In a urban environment, frequencies in this band encounter multipath propagation effects due to buildings and other structures. A system operator at the central monitoring station 115 would accordingly guide the search team to the location of the unknown position transmitter 106.

In a preferred embodiment of the present invention, the unknown position transmitter 106 generates a 20 kbits per second minimum shift keying (MSK) modulated carrier and frequency hops at 400 Hz rate. The 400 Hz signal is used by the associated base repeaters 110 for coarse positioning. The 20 kHz bit clock is used for fine positioning, but it has a 9.3 mile ambiguity. The 400 Hz signal converts this ambiguity to 466 miles, beyond the maximum range of the transmitter. The method of demodulation efficiently uses all the energy in the transmitted signal to quickly compute a resulting time-of-arrival. A 10 ms. burst of signal at the specified maximum range will yield an outdoor measuring accuracy of 440 feet RMS.

Because the wavelength of the modulation is very much longer than the multipath, the demodulated signal is a sine wave whose phase is the average path delay. This provides smooth time delay changes with unknown position transmitter location and enables differential positioning to work well. Narrow bandwidth FM and narrow bandwidth phaselock demodulators can be used to reduce the capture effect for optimum multipath tolerance.

Grid Synchronization

Each of the base repeaters 110 must include an internal, very accurate time base reference to measure relative time-of-flight of a radio wave emitted by an unknown position transmitter. In a preferred embodiment cesium atomic clocks (100 ns drift/day) are desired for such measurements. Practical implementations, however, would make this cost prohibitive. Instead less accurate (10 ns drift/min) oven controlled crystals can be used. The additional time drift is removed by synchronizing to a 10 ms pulse initiated once per second by the central monitoring station. This 10 ms. master grid synchronization pulse is ample to synchronize any base repeater in a 54 mile radius of the central monitoring station 115.

The speed that radio waves propagate through the atmosphere may vary on a day to day or hourly basis. Natural phenomenon of temperature, atmospheric pressure, humidity all add into the source of this variance. Since the base repeaters 110 are at fixed, surveyed sites, the time-of-flight of the master grid synchronization pulse can be used as a system wide dynamic propagation error correction. The time base in the base repeaters 110 is synchronized to within $\pm 25$ ns of the 10 ms master grid synchronization (20 MHz Transmitter timing clock). The time-of-flight measurements, however, are obtained to 2.5 ns resolution which is four times the ultimate system accuracy. The base repeater time base is stable enough to drift less than 2.5 ns in 15 seconds.

Interruptible Polling Scheme

In an emergency situation, the unknown position transmitter must be able to demand action from the central monitoring station as quickly as possible. A two-way polled system configuration optimizes the total number of serviced users per unit time by removing data collisions caused by unsynchronized one-way transmissions. A polled only system has very slow mean response time to an unsynchronized event. Unsynchronized one-way communication techniques severely limit the number of simultaneous demands that the system can handle. A hybrid scheme of partially synchronized demands and synchronized polls is preferred. The master grid synchronization pulse is used to initiate the beginning of the repetitive one second time interval. This interval is broken into time slots for unknown position transmitter unsynchronized demands, synchronized polls and acknowledges and bursts of block transfers from the base repeaters 110 to the central monitoring station 115.

The hybrid polling scheme will accept up to 16 demands in any one second interval. Thus, demanding unknown position transmitters will transmit their requests in one of 16 demand slots. The closest base repeater 110 will then send an acknowledge to these demanding unknown position transmitters. This converts the system from unsynchronized to synchronized in just several seconds from the initiating event. The poll rate can now be lowered and optimized by the central monitoring station for the type of event as determined by the associated data base entry. By intelligently using both demands and polling, usable system throughput can be dramatically increased by eliminating the need for continuous and superfluous position fixes.

A maximum of 57,000 demands can be processed per hour. A maximum of 100,000 poll/replys can be processed per hour. The usable throughput, in effect, far exceeds nonhybrid techniques.

The central monitoring station initiates the master grid synchronization 10 ms. pulse once per second. All the base repeaters 110 acquire this pulse and synchronize internal timing oscillators with it. The base repeaters 110 then redress this pulse to unknown position transmitters as a slave grid synchronization, SGS, pulse. An unknown position transmitter 106, that requires immediate service, uses the SGS pulse to determine the start of available time slices for a demand request. Using its own unique identification (ID) as a kernel, the unknown position transmitter 106 pseudo-randomly chooses one of 16 demand time slots, transmits a demand message and idles for an acknowledge message from the central monitoring station. Six or more base repeaters 110 verify the unknown position transmitter's demand request and accurately mark the time of reception against an internal known reference. Each of these base repeaters 110 redress the base repeater ID number, the unknown position transmitter's ID number and the relative time of the demand message arrival to the central monitoring station. The central monitoring station 115 collects six or more of these base repeater transmission and signals a base repeater 110 to send a demand acknowledge. The relative time-of-arrival information collected allows the central monitoring computer to calculate the time differences in the six paths to the base repeaters 110. The results are used in a least squares algorithm to plot a three dimensional intersection. All six readings are rated for deviation from the mean. Up to two time differences excessively far from the mean are removed and the algorithm recomputes for a tighter position fix. This position is plotted on an area map display in the central monitoring station. The system operator dispatches a vehicle equipped with a mobile reference transceiver 108 to the area indicated. The central monitoring station 115 begins polling the unknown position transmitter 106 and the mobile reference transmitter 108 contiguously. As the mobile reference transmitter 108 moves close to the unknown position transmitter, the radio path to the base repeaters 110 becomes more and more similar. The closer the two become, the more identical are the effects of any multipath errors. The central monitoring station 115 can now guide the mobile reference transmitter to the unknown position transmitter 106 via voice radio links. The differential accuracy is 10 times greater than the original grid position fix. When the unknown position transmitter 106 is visually found the central monitoring station 115 ceases to poll and the event is stored in a historical file.

The master grid synchronization pulse is originated by the central monitoring station 115 and synchronizes the entire system. This pulse is also coded for additional system security. The code contains the ID code of the central monitoring station 115. Since the base repeaters 110 are physically independent of the central monitoring station 115, provision has been made, in the case of disasters, that the redundant central monitoring stations could be deployed in an entirely different area of the town. A remote master has a unique ID and would have to download its associated position variation to the base repeaters 110 in the grid.

The master grid synchronization may originate from a transmitter source in excess of 50 miles from the unknown position transmitter's receiver. To redistribute this signal at an adequate level to all points in the covered area, the master grid synchronization pulse is re-broadcast by all the base repeaters 110. This re-broadcast is the slave grid synchronization pulse.

The time-of-flight of the master grid pulse to the base repeaters 110 may range form 0 to 300 us. Each base repeater 110 must delay some fixed time depending on its position in the grid. This delay compensates each base repeater 110 so that it retransmits the slave grid synchronization simultaneously with all base repeaters 110 in the grid.

Time-of-flight delays will cause time of reception differences at the individual unknown position transmitters 106. This time variance can be great enough to cause inter-symbol delay errors. In order to prevent these errors identical symbols are transmitted. A code of all 0s is sent in the slave grid synchronization pulse. It is essential that the slave grid synchronization pulse be easily identifiable for unknown position transmitter 106 timing acquisition. To accomplish this a unique frequency hop sequence is used for slave grid synchronization that is substantially different from the normal frequency hop sequence used for transmissions.

The demand interval follows the slave grid synchronization pulse after a maximum 300 us delay. The demand interval consists of 16 contiguous 10 ms time slices with a 0.1 ms propagation delay guard between each.

The unknown position transmitter 106 uses its own unique ID code as a kernel for a random number generator. A random time slot 1-16 is chosen and a demand transmitted. The unknown position transmitter 106 then idles for a poll/acknowledge message from the central monitoring station. If the acknowledge is not received in the next slave grid synchronization interval the original demand transmission is assumed to have collided with a simultaneous unknown position transmitter demand transmission. Such collisions are minimized, since numerous different base repeaters 110 may receive a demand. The data communications technique used by the base repeaters 110 has a capture attribute thereby causing its receiver to lock onto the strongest signal only. Any demand 11 dB lower in signal strength will be ignored by that base repeater. In order for two unknown position transmitter demands to be totally lost due to collision, all the responding base repeaters 110 would have to receive the incoming demands within 11 dB of each other. The two unknown position transmitters would have to be in very near proximity out of the whole coverage area and transmitting at exactly the same time to cause such an effect. The collision contingency is, however provided for by a method developed for LAN protocol. When a collision is determined, the random number generator picks a new demand time slot and instead of immediately retransmitting the demand it uses the random number generator to pick a repetition interval from an increasingly growing maximum interval time. This technique allows an arbitrarily large, finite number of simultaneous demands to always get through the communication channel. This is performed at the premium, however, of additional central monitoring station response time delay.

The poll and demand acknowledge messages are initiated by the central monitoring station 115 and retransmitted by the base repeater to a unknown position transmitter 106.

Both poll and demand acknowledge contain the same message format. When a demand occurs it must be terminated by an acknowledge message from the central monitoring station 115 to indicate that an active event has been initiated in the central monitoring station software. Once the acknowledge is received, further position fixes occur on a synchronized, polled basis. The central monitoring station regulates and minimizes polls to only those required during the several phases of a resulting search operation (if the data base entry associated with the unknown position transmitter ID number indicates that a search operation is appropriate).

Polls can also be executed by the central monitoring station 115 without being first initiated by an unknown position transmitter demand message. This is useful for vehicle position updates, for example.

The poll message contains a byte of command code that can be used to elicit a specific action by any remote unknown position transmitter 106. This is useful for vehicle position updates, for example. The poll can also be used simply to update the current unknown position transmitter status (CPU ok, battery ok, and unknown position transmitter within receiving range.).

When a base repeater 110 polls an unknown position transmitter 106, the unknown position transmitter 106 responds with a round trip reply. The reply contains the unknown position transmitter ID code so that communications can be 100% verified.

The size/cost trade-off for transmitter design set the maximum output power to 3.2 watts. The maximum output power per given receiving system and practical maximum range sets the minimum time required for a position fix of a set accuracy. This transmission time in conjunction with the total number of bits to be transmitted and the maximum acceptable bit error rate sets the maximum baud rate.

The maximum outdoor suburban range is 18 miles, the maximum outdoor urban range is 6 miles. This requirement yields an effective baud rate of 5 kbits per second.

During field tests to measure attenuation caused by buildings, houses contributed 10–20 dB (typical) of signal loss, large downtown buildings contributed 15–30 dB (typical) of signal loss. In cases where a unknown position transmitter 106 is indoors and in the outskirts of its transmitting range, the baud rate must be lowered to achieve building structure penetration.

It will be apparent to those skilled in the art that various modifications can be made to the position determination method and apparatus of the present invention without departing from the scope or spirit of the present invention, and it is intended that the present invention cover modifications and variations of the position determination method and apparatus provided they come within the scope of the appended claims and their equivalents.

We claim:

1. A method of radio position determination of an unknown position transmitter using a mobile-reference transceiver and a plurality of base repeater generating a slave grid synchronization pulse for time reference, located at known geographic locations in a geographic area and coupled to a central monitoring station generating a master grid synchronization pulse for time reference, comprising the steps of:

emitting by the unknown position transmitter located within the geographical area, a radio wave having modulation compensation for multipath which also serves as a coarse ranging modulation, and a modulated carrier with an identification code;

receiving by at least three base repeaters the radio wave emitted by the unknown position transmitter and measuring at the base repeaters the relative times-of-arrival of the radio wave with respect to the master grid synchronization pulse for deriving ranging times and therefore ranges from said base repeaters to said unknown position transmitter;

computing from the locations of said base repeaters and the measured times-of-arrival, hyperbolic lines of position for the unknown position transmitter;

computing a coarse-position fix of the unknown position transmitter from the hyperbolic lines of position using a least means squares algorithm;

dispatching a search team having a mobile reference transceiver to the coarse-position fix of said unknown-position transmitter;

transmitting from said mobile reference transceiver located within the coarse-position fix a reference signal having modulation compensation for multipath which also serves as a coarse ranging modulation;

receiving by the base repeaters the reference signal emitted by said mobile reference transceiver and computing a difference between the reference signal and the radio wave, for deriving a differential position vector from said mobile reference transceiver to said unknown position transmitter;

guiding the mobile reference transceiver to said unknown position transmitter using the differential position vector;

emitting a polling message by said mobile reference transceiver;

emitting, in response to receiving the polling message, a reply message by said unknown position transmitter;

independently computing from the polling message and the reply message a local-time-of-flight and therefore the local range from the mobile reference transceiver to the unknown position transmitter; and emitting an audible sound by said unknown position transmitter for assisting in locating the unknown position transmitter.

2. A method of radio position determination of an unknown position transmitter using a mobile-reference transceiver and a plurality of base repeaters having a slave grid synchronization pulse for time reference, located at known geographic locations in a geographic area and coupled to a central monitoring station having a master grid synchronization pulse, comprising the steps of:

emitting by the unknown position transmitter located within the geographical area, a radio wave;

receiving by at least three base repeaters the radio wave emitted by the unknown position transmitter and measuring the relative times-of-arrival of the radio wave with respect to the slave grid synchronization pulse;

computing from the locations of said base repeaters and from the measured relative times-of-arrival a coarse-position fix of the unknown-position transmitter;

transmitting from a mobile reference transceiver located in the geographical area a reference signal;

calculating a differential position vector between said mobile reference transceiver and said unknown position transmitter from the reference signal and the radio wave;

guiding the mobile reference transceiver to said unknown position transmitter using the differential position vector;

emitting a polling message by said mobile reference transceiver;

emitting, in response to receiving the polling message

3. The method as set forth in claim 2 further comprising the step of emitting an audible sound by said unknown position transmitter for assisting in locating the unknown position transmitter.

4. The method as set forth in claim 2 further comprising the step of:

modulating the radio wave with compensation for multipath.

5. The method as set forth in claim 2 further comprising the step of:

modulating the reference signal with compensation for multipath.

6. The method as set forth in claim 1 or 2 further comprising the steps of:

synchronizing the unknown position transmitter to the synchronized pulse.

7. The method as set forth in claim 1 or 2 further comprising the steps of:

synchronizing the mobile reference transceiver to the synchronized pulse.

8. The method as set forth in claim 1 or 2 further comprising the steps of:

transmitting an identification code from the unknown position transmitter to the central monitoring station.

9. A radio position determination system comprising:

an unknown position transmitter for transmitting a radio wave having modulation compensation for multipath which also serves as a coarse ranging modulation, said unknown position transmitter having means responsive to receiving a polling pulse for emitting a reply message;

a plurality of base repeaters having a synchronized pulse for time reference, for receiving the radio wave emitted by said unknown position transmitter and determining the relative times-of-arrival of the radio wave with respect to the synchronized pulse for deriving a set of ranging times and therefore a set of ranges from said base repeaters to said unknown position transmitter;

a central monitoring station coupled to said plurality of base repeaters for computing from the locations of said base repeaters and from the measured relative times-of-arrival, a coarse-position fix of the unknown-position transmitter; and a mobile reference transceiver located within tee coarse-position fix, for transmitting a reference signal, wherein said central monitoring station computes a differential position vector from the reference signal and the radio wave, between said mobile reference transceiver and said unknown position transmitter for guiding said mobile reference transceiver to said unknown position transmitter, and wherein said mobile reference transceiver includes means for emitting the polling message, and responsive to receiving said reply message for determining a said unknown position transmitter and therefore the local range from said mobile reference transceiver to said unknown position transmitter for assisting in locating said unknown position transmitter.

10. The radio position determination system as set forth in claim 9 wherein said unknown position transmitter further includes means for emitting an audible sound for assisting in locating the unknown position transmitter.

11. The radio position determination system as set forth in claim 9 wherein said mobile reference transceiver and said unknown position transmitter each include modulation means for compensating for multipath.

12. The radio position determination system as set forth in claim 9 wherein said mobile reference transceiver and said unknown position transmitter each include means for generating a spread spectrum signal for compensating for multipath.

13. A method of radio position determination of an unknown position transmitter using mobile-reference transceiver and a plurality of base repeater generating a slave grid synchronization pulse for time reference, located at known geographic locations in a geographic area and coupled to a central monitoring station generating a master grid synchronization pulse for base repeater time reference, comprising the steps of:

transmitting the master grid synchronization pulse by the central monitoring station;

retransmitting the master grid synchronization pulse by the base repeaters as a slave grid synchronization pulse, in response to receiving the master grid synchronization pulse;

receiving by the mobile reference transceiver and the unknown position transmitter, the slave grid synchronization pulse for synchronizing with a system protocol cycle, for acquiring system hop timing, and for referring as a frequency reference for subsequent transmitting;

emitting by the unknown position transmitter located within the geographical area, a radio wave having a demand request during a time slot in the system protocol cycle;

determining the base repeater closest to the unknown position transmitter by comparing measured signal to noise ratio;

polling the unknown position transmitter by the central monitoring station via the closest base repeater to the unknown position transmitter in response to the demand request:

responding to the polling of the central monitoring station by the unknown position transmitter during the same time slot in the system protocol cycle;

receiving by at least three base repeaters the radio wave emitted by the unknown position transmitter and measuring the relative times-of-arrival of the radio wave with respect to the master grid synchronization pulse;

computing from the locations of said base repeaters and from the measured relative times-of-arrival a coarse-position fix of the unknown-position transmitter;

transmitting from a mobile reference transceiver located in the geographical area a reference signal;

calculating a differential position vector between said mobile reference transceiver and said unknown position transmitter from the reference signal and the radio wave; and guiding the mobile reference transceiver to said unknown position transmitter using the differential position vector.

14. The method set forth in claim 13 further comprising the steps of:

emitting a polling message by said mobile reference transceiver;

emitting, in response to receiving the polling message, a reply message by said unknown position transmitter; and independently computing from the polling message and the reply message a local-time-of-flight and therefore a local range from the mobile reference transceiver to the unknown position transmitter.

15. The method as set forth in claim 14 further comprising the step of emitting an audible sound by said unknown position transmitter for assisting in locating the unknown position transmitter.

16. The method as set forth in claim 1 wherein the step of measuring at the base repeaters the relative times-of-arrival of the radio wave further includes computing the phase difference between the modulation of the radio wave and the phase of the modulation of the master grid synchronization pulse.

17. The method as set forth in claim 2 wherein the step of measuring at the base repeaters the relative times-of-arrival of the radio wave further includes computing the phase difference between the modulation of the radio wave, and the phase of the modulation of the master grid synchronization pulse.

18. The radio position determination system as set forth in claim 9 wherein said plurality of base repeaters determines the relative times-of-arrival of the radio wave with respect to the synchronized pulse by computing the phase difference between the modulation of the radio wave, and the modulation of the synchronized pulse.

19. The method as set forth in claim 13 wherein the step of measuring at the base repeaters the relative times-of-arrival of the radio wave further includes computing the phase difference between the modulation of the radio wave, and the modulation of the master grid synchronization pulse.

20. A method of radio position determination of an unknown position transmitter using a mobile-reference transceiver and a plurality of base repeaters having a slave grid synchronization pulse for time reference, located at known geographic locations in a geographic area and coupled to a central monitoring station having a master grid synchronization pulse, comprising the steps of:

emitting by the unknown position transmitter located within the geographical area, a radio wave hopping on a plurality of frequencies for overcoming faded reception and for providing a coarse ranging modulation;

receiving by at least three base repeaters the radio wave hopping on each of the plurality of frequencies emitted by the unknown position transmitter and measuring the relative times-of-arrival of the radio wave hopping on each of the plurality of frequencies with respect to the slave grid synchronization pulse;

computing from the locations of said base repeaters and from the measured relative times-of-arrival a coarse-position fix of the unknown-position transmitter, wherein the computing step includes removing the times-of arrival suspect of error due to multipath, thereby resulting in a superior accuracy of location of the unknown transmitter in an urban environment;

transmitting from a mobile reference transceiver located in the geographical area a reference signal;

calculating a differential position vector between said mobile reference transceiver and said unknown position transmitter from the reference signal and the radio wave; and guiding the mobile reference transceiver to said unknown position transmitter using the differential position vector.

21. A radio position determination system comprising:

an unknown position transmitter for transmitting a radio wave hopping on a plurality of frequencies for overcoming faded reception and providing a coarse ranging modulation;

a plurality of base repeaters having a synchronized pulse for time reference, for receiving the radio wave hopping on the plurality of frequencies emitted by said unknown position transmitter and determining the relative times-of-arrival of the radio wave hopping on the plurality of frequencies with respect to the synchronized pulse for deriving a set of ranging times and therefore a set of ranges from said base repeaters to said unknown position transmitter;

central monitoring station means coupled to said plurality of base repeaters for computing from the locations of said base repeaters and from the measured relative times-of-arrival of the radio wave on each of the plurality of frequencies, a coarse-position fix of the unknown-position transmitter, wherein said central processing station computing means includes means for removing the times-of arrival suspect of error due to multipath, thereby resulting in a superior accuracy of the coarse-position fix of said unknown transmitter in an urban environment; and a mobile reference transceiver located within the coarse-position fix, for transmitting a reference signal, wherein said central monitoring station computes a differential position vector from the reference signal and the radio wave, between said transmitter for guiding said mobile reference transceiver to said unknown position transmitter.

22. A radio position determination system comprising:

an unknown position transmitter for transmitting a radio wave, said unknown position transmitter having means responsive to receiving a polling pulse for emitting a reply message;

a plurality of base repeaters having a synchronized pulse for time reference, for receiving the radio wave emitted by said unknown position transmitter and determining the relative times-of-arrival of the radio wave with respect to the synchronized pulse for deriving a set of ranging times;

a central monitoring station coupled to said plurality of base repeaters for computing from the locations of said base repeaters and from the measured relative times-of-arrival, a coarse-position fix of the unknown-position transmitter; and a mobile reference transceiver located within the coarse-position fix, for transmitting a reference signal, wherein said central monitoring station computes a differential position vector from the reference signal and the radio wave, between said mobile reference transceiver and said unknown position transmitter for guiding said mobile reference transceiver to said unknown position transmitter, and wherein said mobile reference transceiver includes means for emitting the polling message, and means, responsive to receiving the reply message, for determining a local-time-of-flight from said mobile reference transceiver to said unknown position transmitter for assisting in locating said unknown position transmitter.

* * * * *